(No Model.)

M. L. RITCHIE.
WATER GRATE BAR.

No. 265,871. Patented Oct. 10, 1882.

WITNESSES:
J. Bines
Jos. R. Smith

INVENTOR
Matthew L. Ritchie
BY Sam'l Campbell
ATTORNEY

UNITED STATES PATENT OFFICE.

MATTHEW L. RITCHIE, OF NEW YORK, N. Y., ASSIGNOR TO JOHN B. KITCHING, OF SAME PLACE.

WATER GRATE-BAR.

SPECIFICATION forming part of Letters Patent No. 265,871, dated October 10, 1882.

Application filed May 31, 1882. (No model.)

*To all whom it may concern:*

Be it known that I, MATTHEW L. RITCHIE, of city, county, and State of New York, have invented an Improvement in Water Grate-Bars, of which the following is a specification.

My invention relates to an improvement in water grate-bars as now used. Those now in use are both cylindrical and oval or flattened, and it has been found that an oval or flattened bar having the same external and internal surface as a cylindrical bar when placed, as used, with the broad surfaces facing each other, forms wider draft-openings, and is therefore superior; but these cannot be substituted for cylindrical bars on account of their shape not conforming to the shape of bearings, and a change from cylindrical to oval or flattened bars necessitates an entire change of bearings.

The object of my invention is to obviate this difficulty.

My invention consists in a combination of the two, so as to form a flattened water grate-bar with cylindrical ends that may at will be substituted for the ordinary cylindrical water grate-bar as now used without change of bearings, as hereinafter more fully set forth.

Figure 1:
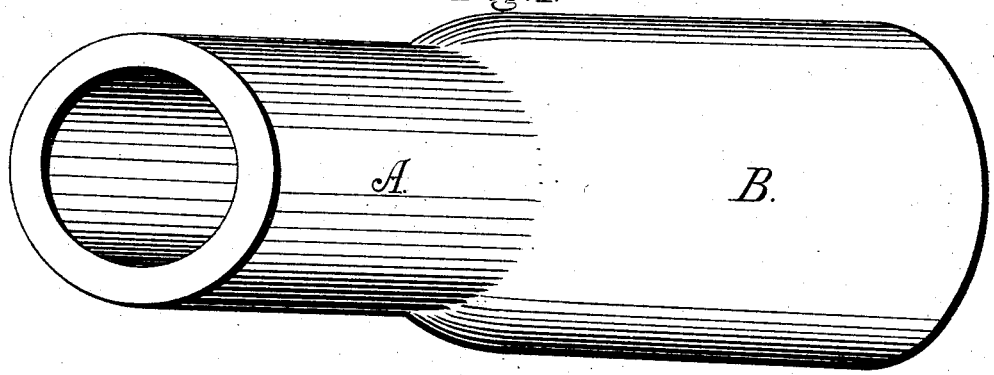
Figure 2:
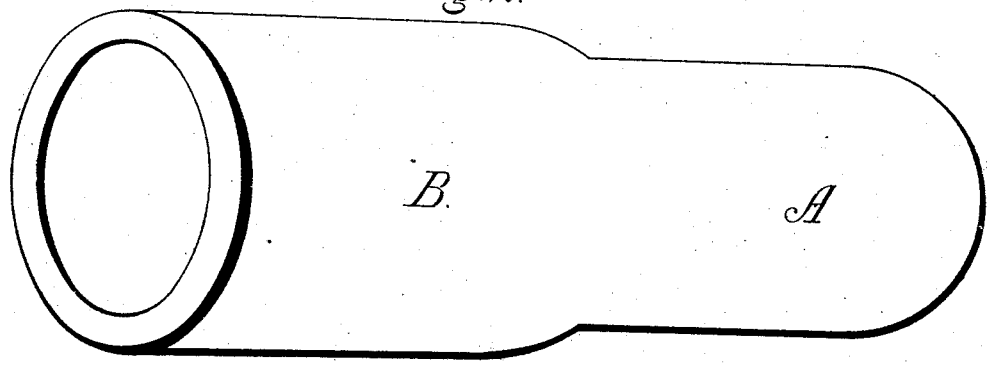
Figure 3:
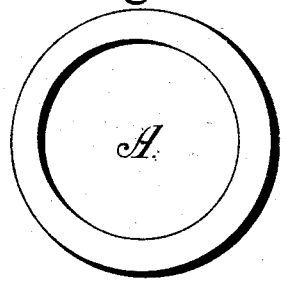
Figure 4:
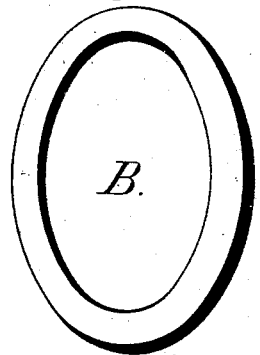

In the accompanying drawings, Figures 1 and 2 represent the combination water grate-bar having so much of the ends A thereof as may be necessary cylindrical, with the central portion, B, thereof oval or flattened. Fig. 3 represents a section of the cylindrical end. Fig. 4 represents a section of the oval or flattened center portion.

Thus we have an oval or flattened bar, B, with cylindrical ends A, which may at any time be substituted for ordinary entire cylindrical bar without necessitating change of bearings.

Having thus described my invention, I claim—

A combination of the oval or flattened with the cylindrical water grate-bar, forming an oval or flattened bar with cylindrical ends that may be substituted for the ordinary cylindrical water grate-bar as now used without change of bearings, as herein set forth.

In testimony that I claim the above I have hereunto subscribed my name in the presence of two witnesses.

MATTHEW L. RITCHIE.

Witnesses:
 SAM. CAMPBELL,
 GEO. G. WILLIAMS.